(12) United States Patent
Johnson et al.

(10) Patent No.: US 6,214,918 B1
(45) Date of Patent: Apr. 10, 2001

(54) CANDLE AND THE METHOD OF MAKING THE SAME

(76) Inventors: Eldon C. Johnson; Colleen L. Johnson, both of 1113 Road 12, Geneva, NE (US) 68361

( * ) Notice: Subject to any disclaimer, the term of this patent is extended or adjusted under 35 U.S.C. 154(b) by 0 days.

(21) Appl. No.: 09/545,761

(22) Filed: Apr. 10, 2000

(51) Int. Cl.[7] .............................. C08L 91/06; C11C 5/00; C10L 5/44; F21S 13/00; F23D 3/16
(52) U.S. Cl. ...................... 524/487; 524/313; 524/489; 44/275; 431/288
(58) Field of Search .............................. 44/275; 106/246, 106/270; 431/288; 524/313, 481, 489

(56) References Cited

U.S. PATENT DOCUMENTS

| | | | |
|---|---|---|---|
| D. 249,588 | 9/1978 | Tanikawa | D73/1 R |
| 4,614,625 | 9/1986 | Wilson | 264/6 |
| 4,639,355 | 1/1987 | Schuettenberg et al. | 44/62 |
| 4,855,098 | 8/1989 | Taylor | 264/103 |
| 5,171,329 | 12/1992 | Lin | 44/275 |
| 5,766,628 | 6/1998 | Nürnberg et al. | 424/450 |

*Primary Examiner*—Peter Szekely
(74) *Attorney, Agent, or Firm*—Zarley, McKee, Thomte, Voorhees & Sease; Dennis L. Thomte

(57) ABSTRACT

A candle and the method of making the same is disclosed wherein the candle consists essentially of about 5 to 40 volume percent of a paraffin wax; about 5 to 10 volume percent of a candle scent; about 0.25 to 1 volume percent of a binding agent; about 50 to 95 volume percent of a soybean oil; and about 1 to 5 drops of a liquid dye. The method of making the candle comprises the steps of: adding a binding agent to paraffin wax and heating the same to about 160° F.; adding soybean oil to the mixture and heating the same to about 160° F.; adding liquid dye to the mixture; adding the candle scent to the mixture; and pouring the mixture into pre-wicked containers.

17 Claims, No Drawings

CANDLE AND THE METHOD OF MAKING THE SAME

BACKGROUND OF THE INVENTION

1. Field of the Invention

This invention relates to a candle and the method of making the same and more particularly to a candle wherein soybean oil comprises about 50 to 95 volume percent of the candle.

2. Description of the Related Art

Many types of candles have been previously provided. In many cases, the candles create undesirable smoke and leave a sooty residue in the area where they were burned.

SUMMARY OF THE INVENTION

A candle composition and the method of making the same are described. The candle composition consists of essentially of about 5 to 40 volume percent of a paraffin wax; about 5 to 10 volume percent of a candle scent; about 0.25 to 1 volume percent of a binding agent; and about 50 to 95 volume percent of a soybean oil. More particularly, the candle consists essentially of about 16.75 volume percent of a paraffin wax having a melting point of 125° F.; about 8 volume percent of a candle scent; about 0.25 volume percent of a binding agent; and about 75 volume percent of a soybean oil. Approximately 1 to 5 drops of a liquid dye is added to the composition.

The method of forming the candle comprises the steps of: adding a predetermined amount of binding agent to a predetermined amount of paraffin wax; heating the binding agent and paraffin wax to a predetermined temperature; adding a predetermined amount of soybean oil to the heated binding agent and paraffin wax mixture; heating the soybean oil, binding agent and paraffin wax mixture to a predetermined temperature; adding a predetermined amount of candle scent to the heated soybean oil, binding agent and paraffin wax mixture; adding a predetermined amount of dye to the mixture; and pouring the mixture into pre-wicked candle containers.

It is a principal object of the invention to provide an improved candle and the method of making the same.

Still another object of the invention is to provide a candle which burns cleanly and does not leave a residue of soot.

Still another object of the invention is to provide a candle which utilizes a high percentage of soybean oil.

Still another object of the invention is to provide an improved method of making a candle.

Still another object of the invention is to provide a candle which is economical of manufacture.

These and other objects will be apparent to those skilled in the art.

DESCRIPTION OF THE PREFERRED EMBODIMENT

The candle composition of this invention consists essentially of about 5 to 40 volume percent of a paraffin wax; about 5 to 10 volume percent of a candle scent; about 0.25 to 1 volume percent of a binding agent; and about 50 to 95 volume percent of a soybean oil together with 1 to 5 drops of a liquid dye. Although the percentages described above may be utilized, the preferred candle composition consists essentially of 16.75 volume percent paraffin wax; about 8 volume percent of a candle scent; about 0.25 volume percent of a binding agent; about 75 volume percent of a soybean oil; and 1 to 5 drops of a concentrated liquid dye.

Preferably, the paraffin wax has a 125° F. melt point. The liquid scent may be any type of conventional scents. One scent which may be used is STRAWBERRY JAM candle scent sold by Candlechem Company, Inc. of Brockton, Mass. The binding agent is preferably VYBAR 103, a branched hydrocarbon with a number average molecular weight of approximately 2800, which aids in the binding of the soybean oil and the paraffin. The soybean oil is a naturally, expelled and extruded soybean oil such as is purchased from a wide variety of processors including Bruning Feed & Grain in Nebraska. Preferably, the liquid dye is one of several dyes available on the market. One such dye is RED DYE sold by Candlechem Company, Inc.

The method of manufacturing the candle is to mix the paraffin wax and the binding agent and heating the same to 160° F. The soybean oil is then added to the paraffin wax and Vybar mixture and heated to 160° F. The liquid dye in the amount of 1 to 5 drops is then added to the heated mixture to provide whatever color it is desired for the candle to possess. The candle scent is then added to the mixture with the mixture being further mixed. The mixture is then poured into pre-wicked candle containers and allowed to cool.

The candles of this invention burn extremely clean and do not leave a sooty residue in the area where they are burned.

Thus it can be seen that the invention accomplishes at least all of its stated objectives.

We claim:

1. A candle composition consisting essentially of about 5 to 40 volume percent of a paraffin wax; about 5 to 10 volume percent of a candle scent; about 0.25 to 1 volume percent of a binding agent; and about 50 to 95 volume percent of a soybean oil.

2. The candle composition of claim 1 further including about 1 to 5 drops of liquid dye.

3. The candle composition of claim 1 containing about 16.75 volume percent of said paraffin wax.

4. The candle composition of claim 1 containing about 8 volume percent of said candle scent.

5. The candle composition of claim 1 containing about 0.25 volume percent of said binding agent.

6. The candle composition of claim 1 containing about 75 volume percent of said soybean oil.

7. The candle composition of claim 1 containing about 16.75 volume percent of said paraffin wax; about 8 volume percent of said candle scent; about 0.25 volume percent of said binding agent; and about 75 volume percent of said soybean oil.

8. The candle composition of claim 7 further including about 1 to 5 drops of liquid dye.

9. The candle composition of claim 7 wherein said paraffin wax has a melting point of 125°F.

10. A method of forming a candle, comprising the steps of:
   adding a predetermined amount of binding agent to a predetermined amount of paraffin wax;
   heating the binding agent and paraffin wax to a predetermined temperature;
   adding a predetermined amount of soybean oil to the heated binding agent and paraffin wax mixture;
   heating the soybean oil, binding agent and paraffin wax mixture to a predetermined temperature;
   adding a predetermined amount of candle scent to the heated soybean oil, binding agent and paraffin mixture; and
   pouring the mixture into pre-wicked candle containers.

11. The method of claim 10 further including the step of adding a candle dye to the mixture.

12. The method of claim 10 wherein said paraffin wax has a melting point of about 125° F. and wherein said paraffin wax and binding agent mixture is heated to about 160° F.

13. The method of claim 12 wherein said paraffin wax, binding agent and soybean oil mixture is heated to about 160° F.

14. The method of claim 10 wherein said paraffin wax comprises about 5 to 40 volume percent of the candle composition; said candle scent comprises about 5 to 10 volume percent of the candle composition; said binding agent comprises about 0.25 to 1 volume percent of the candle composition; and wherein said soybean oil comprises about 50 to 95 volume percent of the candle composition.

15. The method of claim 14 wherein about 1 to 5 drops of a liquid candle dye is added to the candle composition.

16. The method of claim 10 wherein said paraffin wax comprises about 16.75 volume percent of the candle composition; said candle scent comprises about 8 volume percent of the candle composition; said binding agent comprises about 0.25 volume percent of the candle composition; and said soybean oil comprises about 75 volume percent of the candle composition.

17. The method of claim 11 wherein said paraffin wax comprises about 16.75 volume percent of the candle composition; said candle scent comprises about 8 volume percent of the candle composition; said binding agent comprises about 0.25 volume percent of the candle composition; said soybean oil comprises about 75 volume percent of the candle composition; and said candle dye comprises about 1 to 5 drops volume percent of the candle composition.

* * * * *